(12) United States Patent
Wang

(10) Patent No.: US 8,255,015 B2
(45) Date of Patent: Aug. 28, 2012

(54) PORTABLE ELECTRONIC DEVICE

(75) Inventor: Chun-Gang Wang, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 319 days.

(21) Appl. No.: 12/497,755

(22) Filed: Jul. 6, 2009

(65) Prior Publication Data
US 2010/0159997 A1  Jun. 24, 2010

(30) Foreign Application Priority Data
Dec. 22, 2008  (CN) .......................... 2008 1 0306430

(51) Int. Cl.
*H04M 1/00* (2006.01)
(52) U.S. Cl. .................................................. 455/575.1
(58) Field of Classification Search ........... 455/575.1–4, 455/347, 566, 90.3, 128; 361/679.01–679.61; 345/173, 179; 178/19.01
See application file for complete search history.

(56) References Cited

U.S. PATENT DOCUMENTS

| 5,593,239 | A  | * | 1/1997  | Sallee ........................ 403/109.3 |
| 7,425,948 | B2 | * | 9/2008  | Ling et al. ..................... 345/179 |
| 7,809,414 | B2 | * | 10/2010 | Ohki et al. ................. 455/575.4 |
| 2006/0044288 | A1 | * | 3/2006  | Nakamura et al. ............ 345/179 |
| 2007/0117430 | A1 | * | 5/2007  | Lin et al. ....................... 439/164 |
| 2010/0007251 | A1 | * | 1/2010  | Hsu et al. .................... 312/223.1 |
| 2010/0142175 | A1 | * | 6/2010  | Cheng et al. .................. 361/825 |
| 2010/0331059 | A1 | * | 12/2010 | Apgar et al. ................ 455/575.1 |

FOREIGN PATENT DOCUMENTS
TW           M312180      * 11/2006

* cited by examiner

*Primary Examiner* — Kent Chang
*Assistant Examiner* — William Lu
(74) *Attorney, Agent, or Firm* — Altis Law Group, Inc.

(57) ABSTRACT

A portable electronic device includes a main body and a touch pen. The main body includes a first surface and a second surface opposite to the first surface. One or more accessories, such as a display and/or camera can be positioned on the first surface. A touch pen includes a support pole and a pivot portion formed on an end of the support pole. The main body defines a sliding groove in the second surface. The pivot portion slidably engages in the sliding groove. When the pivot portion slides to an end of the sliding groove, the main body is capable of being support by the touch pen.

11 Claims, 5 Drawing Sheets

PORTABLE ELECTRONIC DEVICE

BACKGROUND

1. Technical Field

The present disclosure relates generally to portable electronic devices and, more particularly, to a portable electronic device with a touch pen.

2. Description of Related Art

Electronic devices, such as mobile phones, are widely used in modern society. The electronic devices generally have support poles to stably support the electronic devices on a desktop. Therefore, a user does not need to hold the electronic devices in hand to operate it. Especially, when the user wants to use the electronic device to take photos, the hands of the user may shake, thus affecting a quality of the photos. If the electronic devices are placed on the desktop and supported by the support poles, the user can take photos with no shake.

A typical mobile phone includes a main body, a support pole, and a hinge assembly. The support pole is rotatably connected to a side of the main body via the hinge assembly. The support pole can rotate through an angle relative to the main body, thus supporting the main body on the desktop.

However, the mobile phone has a poorer appearance because the hinge assembly is connected to the mobile phone directly. In addition, the hinge assembly has a plurality of components, resulting in that the mobile phone cannot be made thinner.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
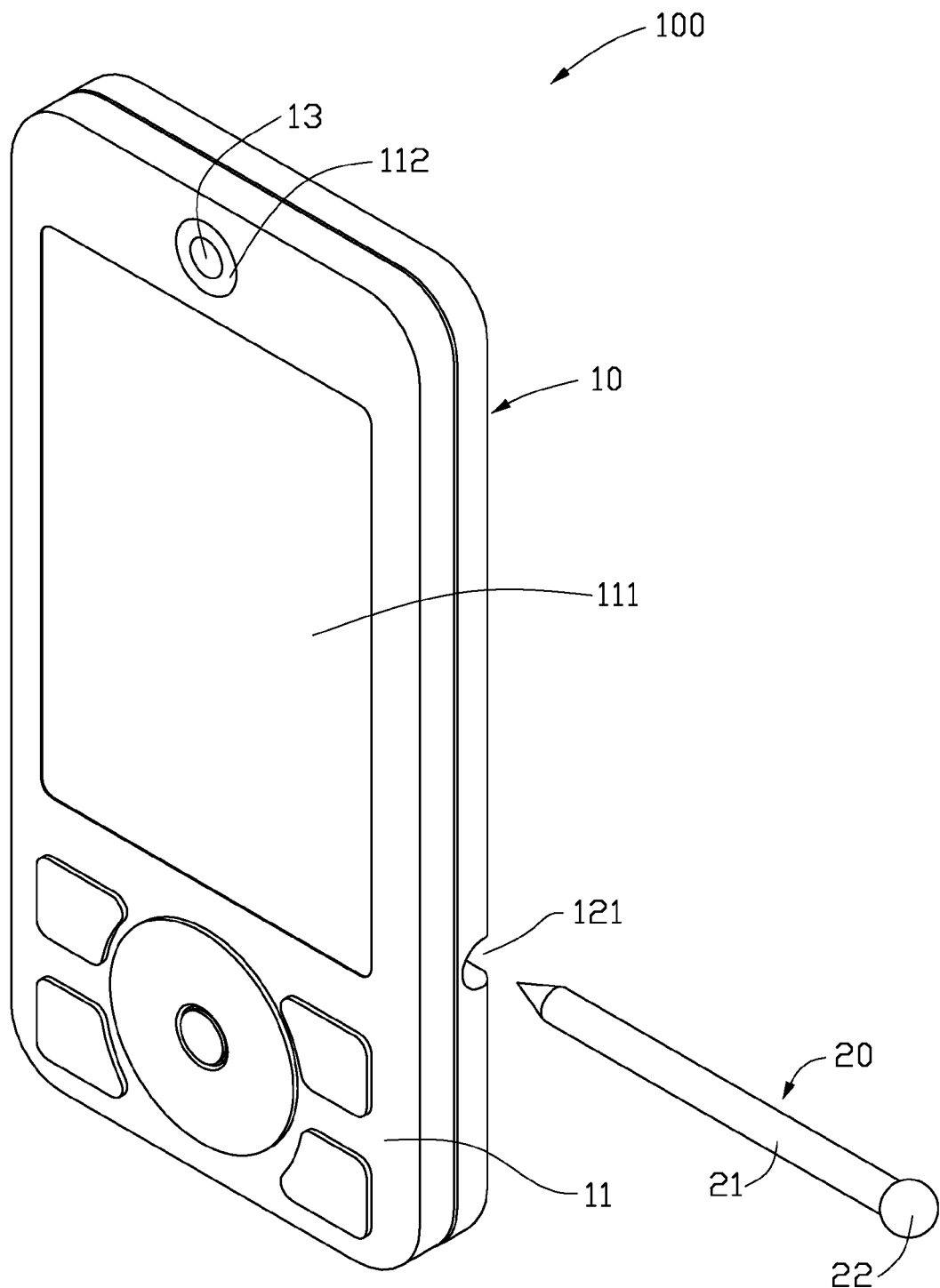
FIG. 1 is an exploded, isometric view of an embodiment of a portable electronic device, the electronic device including a main body and a touch pen.
Figure 2:
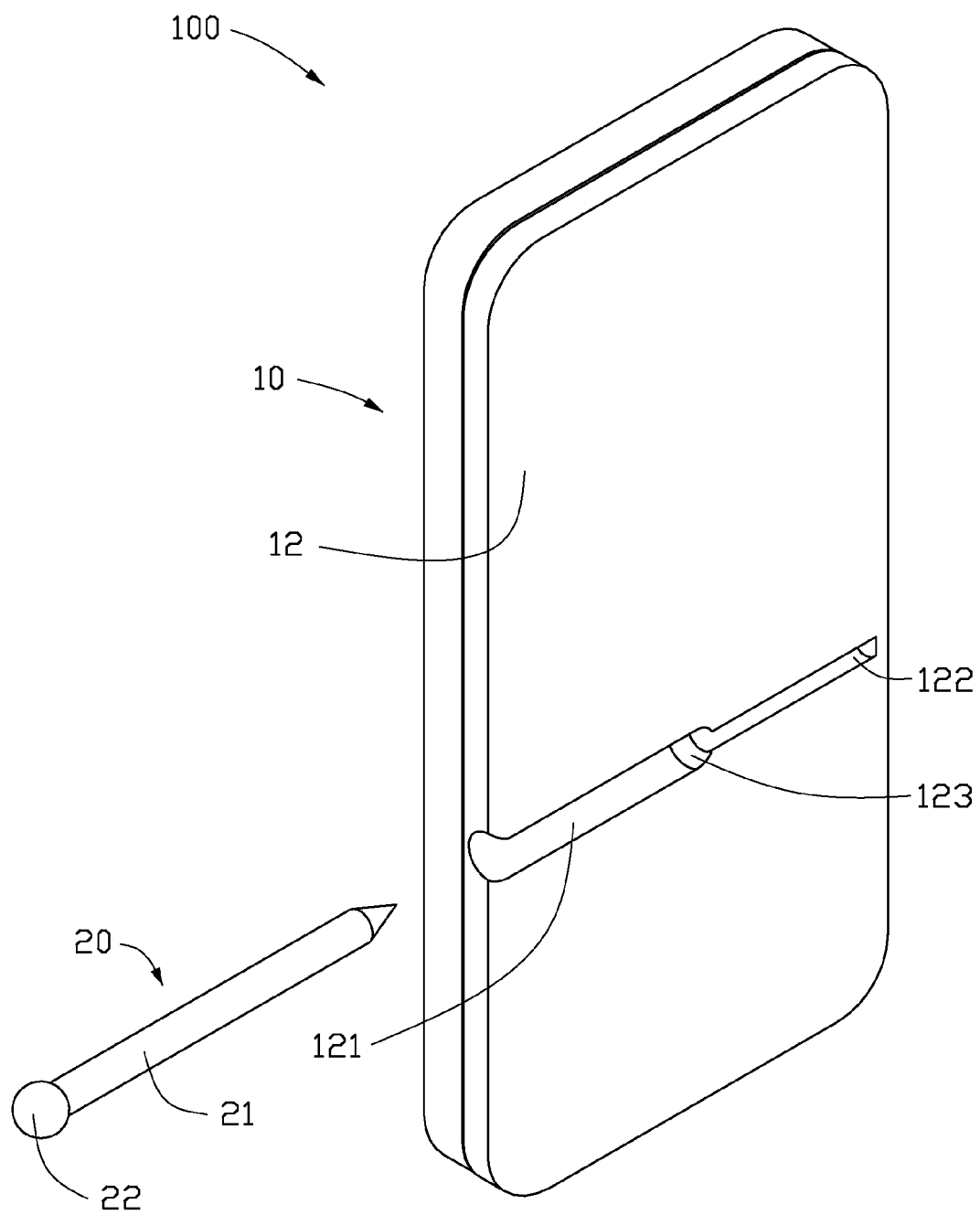
FIG. 2 is similar to FIG. 1, but viewed from another aspect.

Referring to FIGS. 1 and 2, an embodiment of an electronic device 100 includes a main body 10 and a touch pen 20.

The main body 10 includes a first surface 11 and a second surface 12 opposite to the first surface 11. One or more accessories are positioned on the first surface 11. The accessory may comprise a display 111 positioned on a middle portion of the first surface 11. Also, the main body 10 may define a hole 112 in the first surface 11 adjacent to the display 111. Then, the accessory may comprise a camera module 13 received in the through hole 112 of the main body 10. The main body 10 further defines a sliding groove 121, a receiving groove 122, and a pivot slot 123. The pivot slot 123 communicates the sliding groove 121 with the receiving groove 122. The sliding groove 121, the pivot slot 123, and the receiving groove 122 are co-linear. A width of the sliding groove 121 is larger than that of the receiving groove 122. A width of the pivot slot 123 decreases from a first end adjacent to the sliding groove 121 to a second end adjacent to the receiving groove 122. In the illustrated embodiment, the electronic device 100 is a mobile phone, and the display 111 is a touch panel.

The touch pen 20 includes a support pole 21 and a pivot portion 22 formed on an end of the support pole 21. In the illustrated embodiment, the support pole 21 is cylindrical, and the pivot portion 22 is spherical. The pivot portion 22 is made of elastic materials. A width of the support pole 21 is slightly smaller than that of the receiving groove 122. A diameter of the pivot portion 22 is slightly larger than a width of the sliding groove 121. Since pivot portion 22 is made of an elastic material, there can be a friction fit between the pivot portion 22 and the sliding groove 122.

Figure 3:
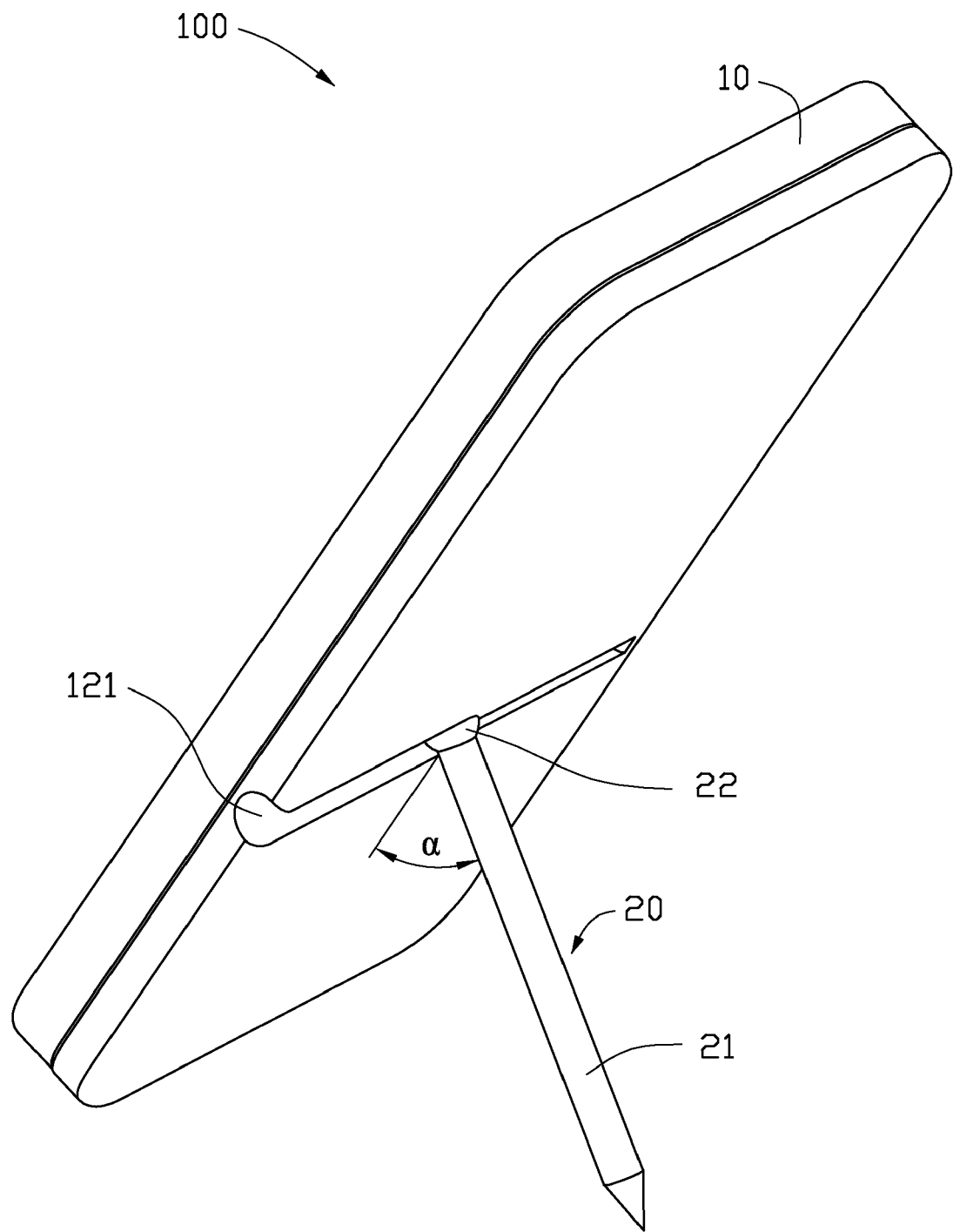
FIG. 3 is an isometric view of the portable electronic device of FIG. 1, with the main body lengthways supported by the touch pen.
Figure 4:
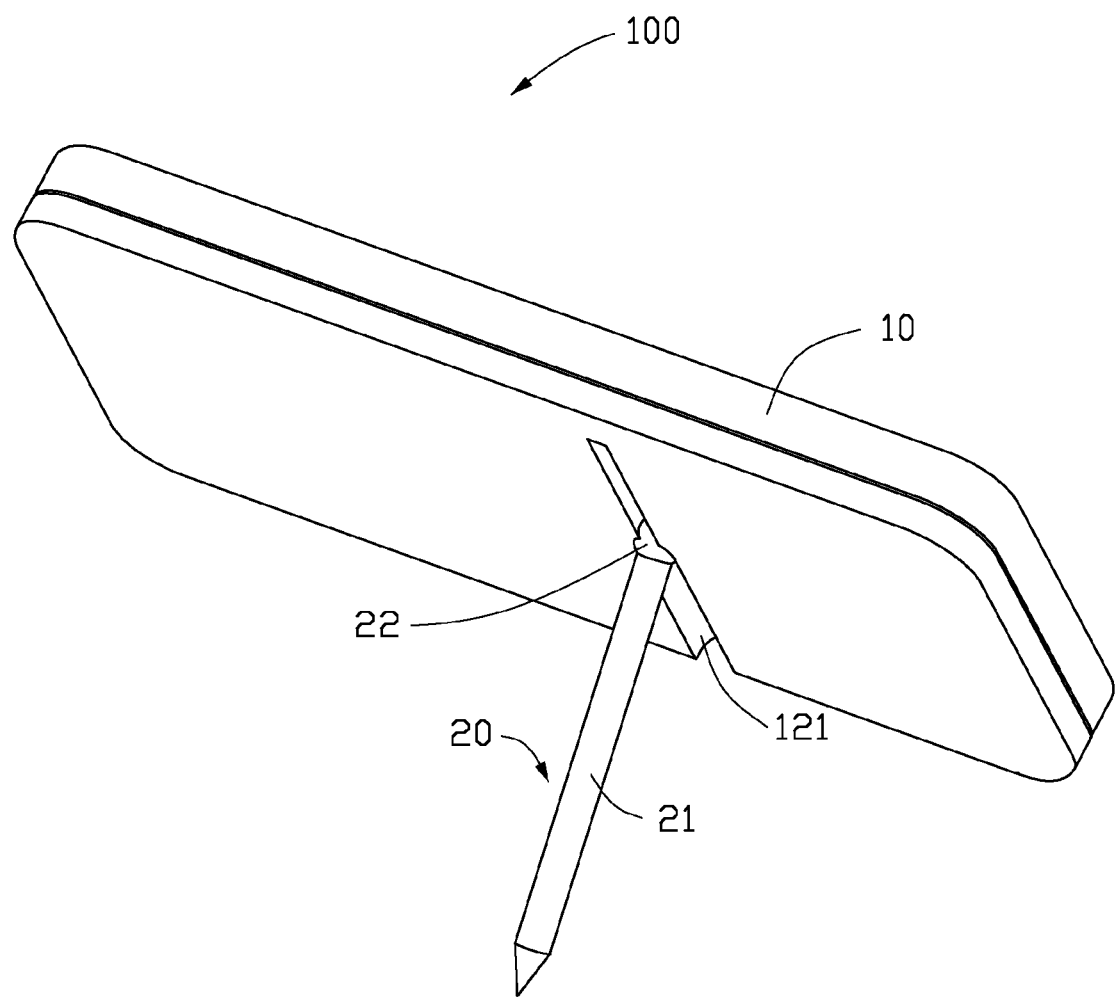
FIG. 4 is an isometric view of the portable electronic device of FIG. 1, with the main body transversely supported by the touch pen.

Referring to FIGS. 2, 3 and 4, in use, the pivot portion 22 of the touch pen 20 is inserted into the sliding groove 121 from a side of the main body 10, slightly compressing the pivot portion 22. The pivot portion 22 slides in the sliding groove 121 until the pivot portion 22 engages in the pivot slot 123. Thus, the pivot portion 22 is positioned at a middle portion of the main body 10. The touch pen 20 is rotated at an angle α relative to the main body 10, allowing the main body 10 to be obliquely supported on a surface via the touch pen 20. That is, the main body 10 is stably positioned on the desktop. Therefore, the display 111 of the main body 10 can be conveniently viewed, and can be furthered be used to capture clear images via the camera module 13. In addition, the angle α between the main body 10 and the touch pen 20 can be adjusted to a preferred angle by rotating the touch pen 20. As shown in FIGS. 3 and 4, the main body 10 may be supported vertically (FIG. 3) or horizontally (FIG. 4).

Figure 5:
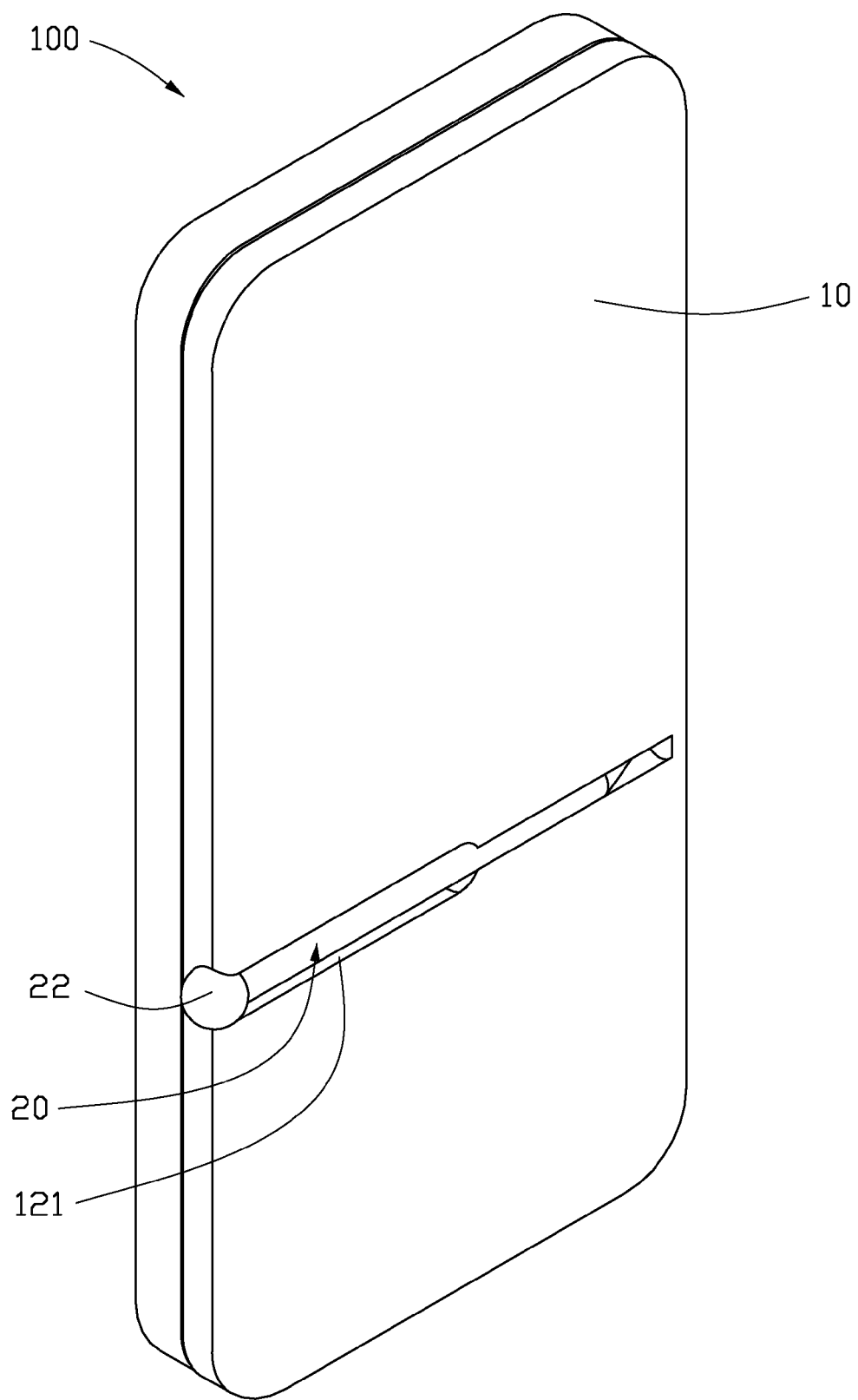
FIG. 5 is an isometric view of the portable electronic device of FIG. 1, with the touch pen received in the main body.

Referring to FIGS. 2 and 5, when the main body 10 does not need to be supported, the support pole 21 is inserted into the sliding groove 121, and passed the sliding groove 121, the pivot slot 123, and the receiving groove 122, until the support pole 21 of the touch pen 20 is entirely received in the sliding groove 121, the pivot slot 123, and the receiving groove 122. The pivot portion 22 of the touch pen 20 partially engages in the sliding groove 121.

The main body 10 of the electronic device 100 can be obliquely placed on the desktop vertically or horizontally via the touch pen 20, and the touch pen 20 can be received in the main body 10. Therefore, the electronic device 100 has a simple structure, and can be thinner and lighter.

It should be pointed out that a sloping support surface may be formed on the end of the support pole 21 away from the pivot portion 22, thus supporting the main body 10 more stably. The receiving groove 122 may be not defined in the main body 10, or replaced by an through hole in the main body 10, and the through hole communicates with the sliding groove 121. In addition, the main body 10 may only defines a sliding groove 122, and the pivot portion 22 is slidably received in the sliding groove 122 of the main body.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A portable electronic device, comprising:
   a main body comprising a first surface and a second surface opposite to the first surface, an accessory positioned on the first surface; and
   a touch pen comprising a support pole and a pivot portion non-rotatably formed on an end of the support pole;

wherein the main body defines a pivot slot and a sliding groove in the second surface, the sliding groove communicates with the pivot slot, a width of the pivot slot decreases from a first end adjacent to the sliding groove to a second end away from the sliding groove, the touch pen is received in the sliding groove and the pivot slot; the pivot portion is capable of sliding in the sliding groove until the pivot portion engages in the pivot slot, then the pivot portion of the touch pen rotatably engages the pivot slot, the pivot portion rotates in the pivot slot to cause the support pole to move relative to the main body, allowing the main body to be obliquely supported on a surface via the touch pen.

2. The portable electronic device of claim 1, wherein the pivot portion is spherical.

3. The portable electronic device of claim 2, wherein the support pole is cylindrical.

4. The portable electronic device of claim 1, wherein the pivot portion is made of elastic material.

5. The portable electronic device of claim 1, wherein the electronic device is a mobile phone.

6. The portable electronic device of claim 5, wherein the accessory is a touch panel.

7. A portable electronic device, comprising:
a main body defining a sliding groove, an engaging groove, and a receiving groove, the engaging groove communicating the sliding groove with the receiving groove, a width of the pivot slot decreases from a first end adjacent to the sliding groove to a second end adjacent to the engaging groove; and
a touch pen received in the sliding groove, the engaging groove and the receiving groove, the touch pen comprising a support pole and a pivot portion formed on an end of the support pole;
wherein after the pivot portion slides in the sliding groove to the pivot slot, the pivot portion of the touch pen is capable of rotating in the engaging groove allowing free movement of the touch pen along a conical path, wherein the pivot slot defines the apex of the conical path, and wherein the touch pen moves along the conical path.

8. The portable electronic device of claim 7, wherein the pivot portion is spherical.

9. The portable electronic device of claim 8, wherein the support pole is cylindrical.

10. The portable electronic device of claim 7, wherein the pivot portion is made of elastic material.

11. The portable electronic device of claim 7, wherein the electronic device is a mobile phone.

\* \* \* \* \*